June 14, 1966   L. B. WALLERSTEIN   3,255,748
SURGICAL MOLESKIN
Filed Sept. 7, 1960
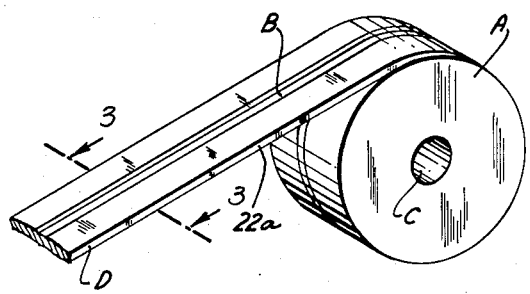
FIG. 1
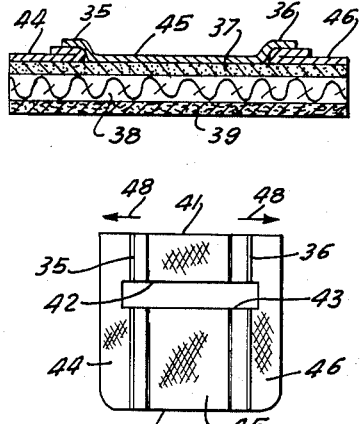
FIG. 4
FIG. 5
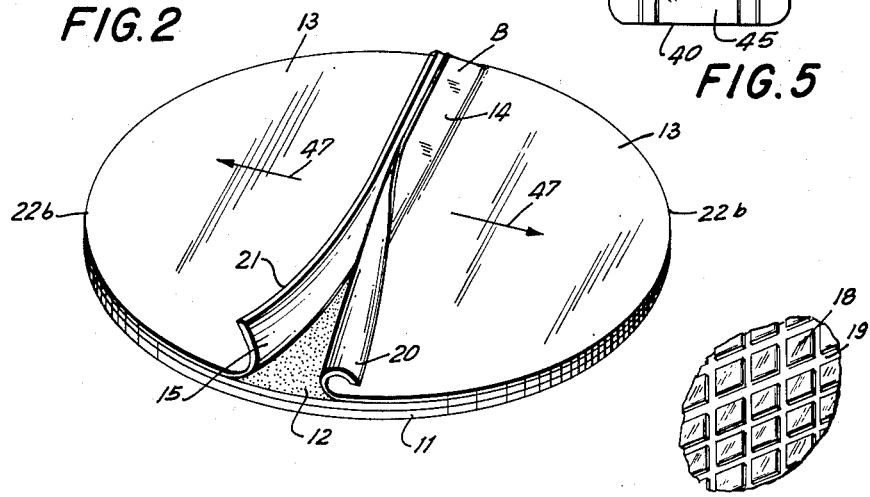
FIG. 2
FIG. 6
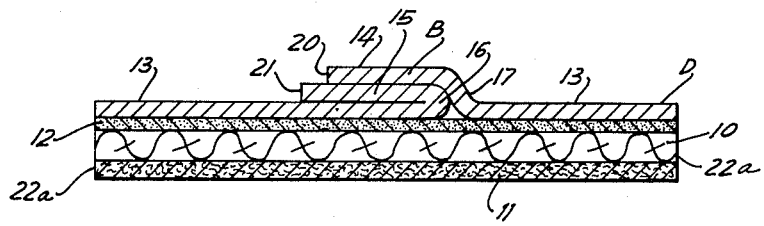
FIG. 3
INVENTOR.
LAWRENCE B. WALLERSTEIN
BY
ATTORNEY.

United States Patent Office 3,255,748
Patented June 14, 1966

3,255,748
SURGICAL MOLESKIN
Lawrence B. Wallerstein, New Rochelle, N.Y., assignor to The American White Cross Laboratories, Inc., New Rochelle, N.Y., a corporation of New York
Filed Sept. 7, 1960, Ser. No. 54,422
2 Claims. (Cl. 128—149)

The present invention relates to a surgical moleskin, and it particularly relates to a surgical moleskin which may be used by chiropodists or in the surgical or allied professions in connection with the treatment of the body.

It is among the objects of the present invention to provide a surgical moleskin which may be readily applied and which will be protected during storage, merchandising and application and so that the adhesive coating applied thereto will be immediately available when required.

Another object is to provide a novel surgical moleskin laminate in which the moleskin may be readily cut or shaped by the user thereof before application to the body without affecting the adhesive coming in contact with the body and then may be applied after shaping and forming to the body after exposure of the adhesive face thereof.

A still further object of the present invention is to provide a novel surgical moleskin construction in which the moleskin may be manufactured by continuous laminating process and at the same time will be readily handled and shaped by the chiropodist or podiatrist.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable to form a moleskin laminate consisting of a heavy cotton flannel which is heavily napped or soft surfaced on one side for the face away from the skin, and which carries a heavy layer of a pressure sensitive adhesive on the other side.

Where a protective removal sheet is then applied to the adhesive side, it has been quite difficult to remove the same since the edges of the cover sheet will closely adhere to the edges of the napped adhesive coated heavy cotton base.

On the other hand, if the rubber adhesive coating or other heavier adhesive is not protected, it will attach itself to various objects and must be specially prepared for application.

At the same time it is also desirable to protect the heavy adhesive layer which is usually of a synthetic and/or natural rubber base from undesired contact with the air while leaving portions thereof free of contact so that there will be closely spaced areas of adhesiveness which is separated by adjacent areas of lesser adhesiveness so that most satisfactory applications to the surface of the skin may be achieved.

In one preferred structure according to the present invention, these difficulties are obviated by providing a cover sheet of an embossed linear high density thin polyethylene material which will protect the heavy adhesive coating from the air and with contact with other objects permitting such to be readily rolled and which at the same time will not adhere to the adhesive and may be readily removed prior to application.

Furthermore, such linear high density polyethylene sheeting, particularly when embossed, has been found to have sufficient temporary adhesiveness to the rubber adhesive surface of material or synthetic rubber to prevent ready removal thereof except under a structural sidewise pulling force.

At the same time across the middle or central portion of the moleskin, the polyethylene cover sheet will be provided with superimposed flaps which will be out of contact with the heavy rubber adhesive face and will be readily susceptible to lateral pulling to remove the protective face from the rubber adhesive.

A particular advantage of this moleskin construction is that the laminate may be shaped or cut to size and form while the rubber adhesive layer is still protected and without displacement of the laminate so that the round or other irregular shaped patches may be formed with central openings if desired of varying shapes following which the overlapping folded central portions may be readily seized by the fingers and removed so that the rubber adhesive face may be uncovered and attached to the face surface.

Although not specifically limited thereto, it has been found most satisfactory to have the overlapping removal plies positioned at least one-half to one inch from the edge of the strip with there being such overlapping removal plies at least every one and one-half to two inches of width.

Desirably, the polyethylene may be of .004 to .005" in thickness with an embossment extending over the entire surface thereof either diamond or circular shaped having elevated portions of $\frac{1}{32}$ to $\frac{1}{16}$" with separating portions of $\frac{1}{64}$ to $\frac{1}{128}$".

The preferred base material is a heavy cotton flannel napped on one side upon which is calendered or solvent spread by a roll or knife, the rubber adhesive coating.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top perspective view of a roll of moleskin according to the present invention showing the overlapping central removal plies.

FIG. 2 is a typical cutout showing the manner in which the portions of the laminate of FIG. 1 may be removed and cut to size with the removal plies being readily accessible and being in practically removed position upon an enlarged scale as compared to FIG. 1.

FIG. 3 is a transverse cross sectional view taken upon the line 3—3 of FIG. 1 upon an enlarged scale as compared to FIG. 1.

FIG. 4 is a diagrammatic transverse sectional view upon a small scale indicating a double removal ply.

FIG. 5 is a diagrammatic top perspective view indicating another form of cutout with double removal plies and also showing the embossment or corrugation of the polyethylene facing.

FIG. 6 is a diagrammatic illustration of the type of embossing to be applied to the cover strip.

Referring to FIG. 1, there is shown a roll strip of moleskin A having a central core with overlapping central removal strips B which may be unrolled at D and cut off as indicated in FIG. 3.

Referring to FIG. 3, there is shown a heavy cotton base 10 of woven cotton which may have a weight of eight to ten and one-half ounces per square yard and which may be of white or flesh color with a napped or other soft finished face 11 and with a roller or calendered coating of a natural or synthetic rubber adhesive 12.

The rubber adhesive is applied, relatively heavy layer of between .005 to .015", and it should be protected from contact with the air and contact with other surfaces except the protective sheet until it is applied to the skin.

The preferred protective sheet is an embossed serrated or corrugated polyethylene sheet which is applied as indicated at 13 with the overlapping unattached removal plies 14 and 15 forming the double superimposed layer as indicated at B in FIGS. 1 to 3.

Desirably, the underlayer 15 has a sharp bend as indicated at 16 while the top ply 14 has an offset bend 17.

The polyethylene cover sheets which are desirably of linear high density polyethylene sheeting material of .004 to .005" in thickness are desirably embossed as indicated in FIG. 6 with the major portion of the embossed surface being removed from and not in contact with the adhesive layer 12 and forming a series of closely spaced elevated pockets over the entire surface of the adhesive layer 12.

Among one of the designs that may be utilized for the embossing is the diamond design diagrammatically illustrated in FIG. 6 with the diamond portions 18 being elevated away from the heavy face 12 and with the contact being established along the separating lines or contact line 19.

Desirably, the embossment 18 should form the elevated pockets where there is no contact between the polyethylene cover strips 13 and the adhesive layer 12 whereas the contact is restricted to the separate contact margins or lines 19 between the embossed portions 18.

Although both the superembossed removal plies 14 and 15 may terminate, at the same edge, it has been found desirable to have the edge 20 of the top ply 14 terminate short of the bottom edge 21 of the bottom ply 15.

Another strip is unwrapped in FIG. 1 at D, and then cut into suitable shapes indicated in FIG. 2.

The plies 14 and 15 may be readily grasped by the fingers, and the adhesive face may be exposed as indicated at 12 in FIG. 2 without the necessity of trying to detach the facing strips 13 at a sharp straight edge as indicated, for example, at 22a and 22b in FIGS. 2 and 3, where difficulty would be experienced in grasping the edge of the strips 13 and separating it from the adhesive face 12.

The polyethylene should have sufficient resiliency so as not to crack or brittlize at the sharp end 16 at the offset bend 17.

Furthermore, the two plies 14 and 15 should be so superimposed that various shapes and forms could be cutout as indicated in FIGS. 4 and 5 without effecting such superimposed plies.

In the structure as shown in FIGS. 4 and 5, there may be two superimposed removal plies 35 and 36 applied to and over the base coat of adhesive 37 which is on top of the cotton base 38 having the velvety or napped face 39.

The outer cut edges 40 and 41 as well as the inside cut edges 42 and 43 may extend over the removal plies 35 and 36 so that the removal plies will always be available for removal of the polyethylene facing strips 44, 45 and 46.

Desirably, the pull in removing the cover strips 13 of FIGS. 2 and 3 and the cover strips 44, 45 and 46 in FIGS. 4 and 5 will be lateral as indicated by the arrows 47 of FIG. 2 and 48 in FIG. 5.

This removal is desirably achieved by forming a diagonal pattern of embossing corrugation as indicated in FIGS. 4 and 6.

The laminated product may be formed in various widths of 12 inches and even 24 inches with the superimposed cover strips 13 of FIG. 2 and 44, 45 and 46 of FIG. 4 being of 2 inches or 3 inches in width and with the superimposed removal plies B of FIGS. 1 to 3 and 35 and 36 of FIGS. 4 and 5 being located at spacings of about 1½ and 2 inches.

Then the wide moleskin laminate may be sliced into the desired widths as indicated in FIG. 4 with each sliced portion having one or more of the removal plies B.

This lamination as well as the application of the rubber adhesive may take place by a continuous laminating procedure.

Linear polyethylene covering material, desirably embossed although in some instances utilized flat material may either be overlapped as indicated in FIG. 1 at the center of the strip B or it may be offset at either side, and one or more overlaps may be employed.

Where high density linear polyethylene is utilized, it is not necessary to have heat setting to form the creased portions at 16 or 17 which will retain their crease and not tend to stand upright but will lie flat until seized by the fingers as indicated in FIG. 2.

It is thus apparent that the applicant has provided a novel, readily applicable, moleskin laminate which may be formed to various shapes to be applied to the human body or to cloth to be worn on the human body, such as shoes or girdles to protect the skin against abrasion or adverse effects.

As many changes could be made in the above surgical moleskin, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A moleskin laminate consisting of an elongated parallel edged strip of a three-ply moleskin having an outer exposed napped face and intermediate woven fabric composed of heavy woven cotton with a weight of 8 to 10½ ounces per square yard, and an inside pressure sensitive rubber base adhesive layer composed of a heavy rubber adhesive layer of a thickness of between .005 to .015 inch, a plurailty of embossed polyalkylene cover strips extending the length of the moleskin laminate with the outer edges corresponding to the parallel edges of the moleskin laminate and the central longitudinally extending median edges of the cover strips overlapping and being pressed down on one another along full length of the moleskin laminate, said embossments extending over the entire surface thereof with such embossments having elevated portions of $\frac{1}{32}$ to $\frac{1}{16}$ of an inch and intermediate channels of $\frac{1}{64}$ to $\frac{1}{128}$ of an inch.

2. The moleskin of claim 1, said polyalkylene being polyethylene.

References Cited by the Examiner

UNITED STATES PATENTS

| 2,486,669 | 11/1949 | Nassimbene | 154—63.5 X |
|---|---|---|---|
| 2,547,487 | 4/1951 | Penney | 128—156 X |
| 2,712,312 | 7/1955 | Deker | 128—156 |
| 2,721,550 | 10/1955 | Banff | 128—156 |
| 2,896,618 | 7/1959 | Schaefer | 128—156 |

OTHER REFERENCES

Johnson and Johnson Catalog; 1949, page 34.

RICHARD A. GAUDET, *Primary Examiner.*

R. J. HOFFMANN, *Examiner.*

H. PEZZNER, C. F. ROSENBAUM, *Assistant Examiners.*